US012682575B2

(12) United States Patent
Rakshit et al.

(10) Patent No.: US 12,682,575 B2
(45) Date of Patent: Jul. 14, 2026

(54) VIRTUAL ENVIRONMENT-BASED OBSTACLE MANIPULATION

(71) Applicant: International Business Machines Corporation, Armonk, NY (US)

(72) Inventors: Sarbajit Kumar Rakshit, Kolkata (IN); Sathya Santhar, Chennai (IN); Sridevi Kannan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 18/772,233

(22) Filed: Jul. 14, 2024

(65) Prior Publication Data

US 2026/0017893 A1     Jan. 15, 2026

(51) Int. Cl.
*G06T 19/00* (2011.01)
*G06F 3/01* (2006.01)

(52) U.S. Cl.
CPC .............. *G06T 19/00* (2013.01); *G06F 3/013* (2013.01); *G06F 3/017* (2013.01)

(58) Field of Classification Search
CPC .......... G06T 19/00; G06F 3/013; G06F 3/017
See application file for complete search history.

(56) References Cited

U.S. PATENT DOCUMENTS

| | | | |
|---|---|---|---|
| 2020/0026278 A1 | 1/2020 | Khanna et al. | |
| 2020/0169715 A1* | 5/2020 | Liu ....................... | H04N 13/117 |
| 2020/0175655 A1 | 6/2020 | Grossinger et al. | |
| 2021/0352222 A1 | 11/2021 | Zavesky et al. | |

FOREIGN PATENT DOCUMENTS

WO     2022/172270 A1     8/2022

OTHER PUBLICATIONS

"Remove objects from your videos with the Content-Aware Fill panel", last updated on Jan. 5, 2023, Adobe, 15 pps., <https://helpx.adobe.com/in/after-effects/using/content-aware-fill.html>.
"System and Method for Obstruction Removal in Video Stream", An IP.com Prior Art Database Technical Disclosure, IP.com No. IPCOM000236260D, IP.com Electronic Publication Date: Apr. 15, 2014, 3 pps., <https://priorart.ip.com/IPCOM/000236260>.
Asadi et al., "Vision-based Obstacle Removal System for Autonomous Ground Vehicles Using a Robotic Arm", Preprint . Jan. 2019, 9 pps., <https://www.researchgate.net/publication/330617468_Vision-based_Obstacle_Removal_System_for_Autonomous_Ground_Vehicles_Using_a_Robotic_Arm >.

* cited by examiner

*Primary Examiner* — Daniel F Hajnik
*Assistant Examiner* — Jed-Justin Imperial
(74) *Attorney, Agent, or Firm* — Andre Adkins

(57)     ABSTRACT

Techniques are described with respect to a system, method, and computer program product for virtual environment-based obstacle manipulation. An associated method includes receiving a stream of media data associated with a virtual environment; analyzing a plurality of sensor data associated with a user of the virtual environment; detecting one or more obstacles associated with the virtual environment; and optimizing the stream of media data, the optimizing comprising manipulation of the one or more obstacles based on the analysis of the plurality of sensor data.

20 Claims, 6 Drawing Sheets

VIRTUAL ENVIRONMENT-BASED OBSTACLE MANIPULATION

BACKGROUND

This disclosure relates generally to the field of virtual, augmented, extended and/or mixed reality systems, and more particularly to obstacle manipulation within virtual, augmented, extended and/or mixed reality systems.

Virtual reality (VR), Augmented reality (AR), Extended Reality (XR), and/or mixed reality allows a user to experience artificial sensory simulations that are provided with assistance by a computer which also creates a simulation of a physical world. This provides outputs that are detected by a user's vision, hearing, speech, and other senses in order to give the user the illusion of experiencing a real physical world within a virtual environment, rather than simply seeing, hearing, etc. a representation of the physical world. In addition, virtual environments are able to facilitate live events, virtual meetings, and the like that visualize 3-Dimensional video feeds by continuously streaming media data to multiple individuals simultaneously. However, visualizations of various virtual elements within the virtual environment are subjective and are rendered based on a multitude of factors specific to the viewing user including, but not limited to data source (e.g., respective sensory input), user location/orientation, contextual information associated with the respective user, and the like. As a result, a virtual element within a virtual environment may be easily visible to a first user but obstructed by an obstacle for a second user (e.g., referee preventing optimal viewing of a sporting event). Therefore, obstacles within the virtual environment can prevent users from enjoying their personalized perspectives on live events thereby inhibiting the ability to fully immerse themselves in the virtual environment.

SUMMARY

Additional aspects and/or advantages will be set forth in part in the description which follows and, in part, will be apparent from the description, or may be learned by practice of the invention.

A system, method, and computer program product for virtual environment-based obstacle manipulation is disclosed herein. In some embodiments, a computer-implemented method for virtual environment-based obstacle manipulation comprises receiving a stream of media data associated with a virtual environment; analyzing a plurality of sensor data associated with a user of the virtual environment; detecting one or more obstacles associated with the virtual environment; and optimizing the stream of media data, the optimizing comprising manipulation of the one or more obstacles based on the analysis of the plurality of sensor data.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
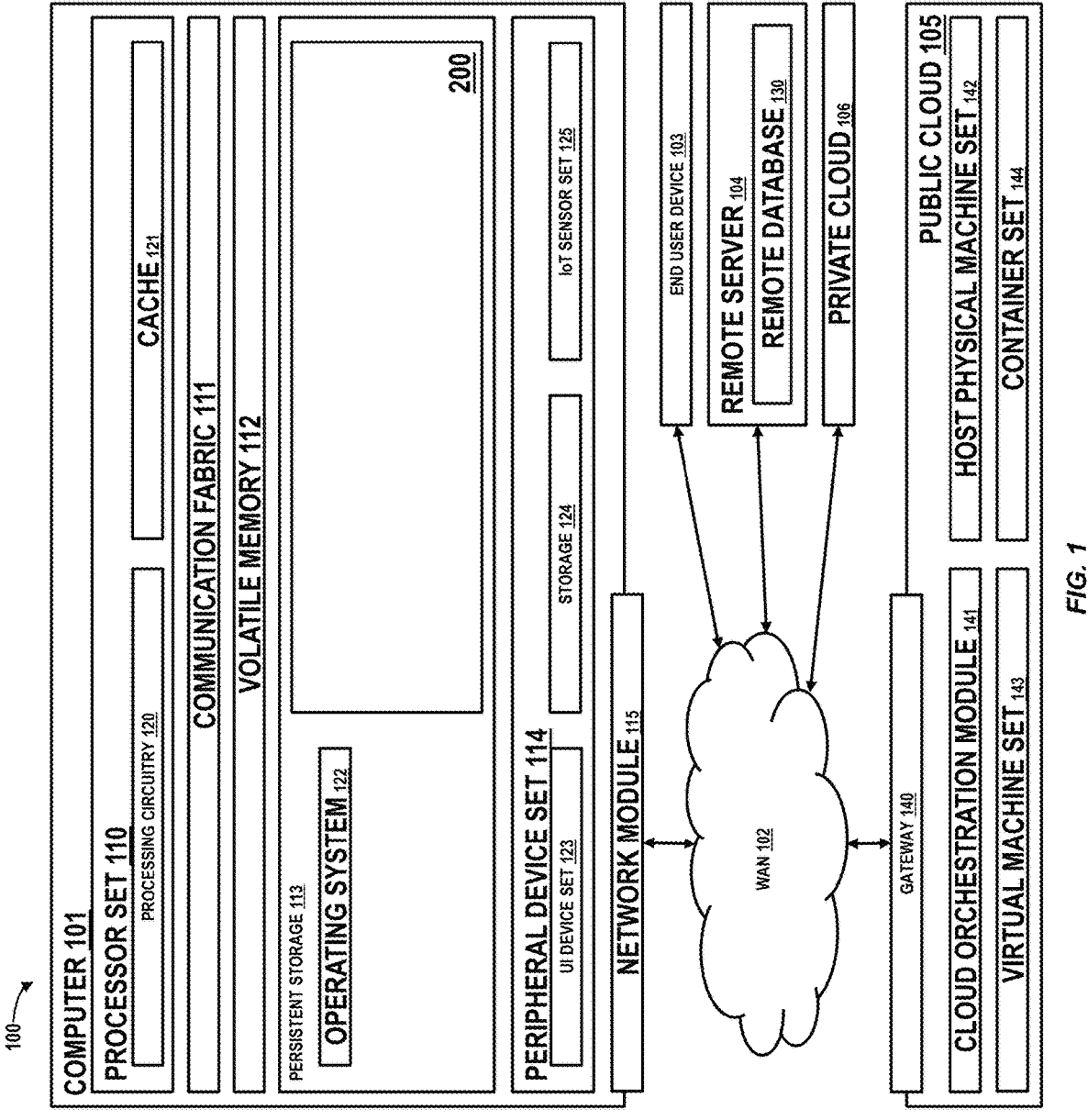
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for virtual environment-based obstacle manipulation. Virtual environments facilitate continuous streaming of media data allowing users dispersed across various locations to view the same event from their respective perspectives. However, perspectives of virtual elements of the virtual environment may be obstructed to a particular user due to various factors such as, but not limited to position, orientation, location, context, and the like. As a result, a first user may have an unobstructed view of an event while a second user may not have the same unobstructed view due to the presence of an obstacle within the virtual environment. Thus, the present embodiments have the capacity to allow users to manipulate obstacles within virtual environments in order to provide users with unobstructed views of virtual elements. In particular, the present embodiments may utilize artificial intelligence-based mechanisms to detect, annotate, and classify obstacles and latent spaces designed for re-allocation within the virtual environments in order for the manipulation of obstacles to be integrated within the streaming media content; thus, optimizing user personalized perspectives on live events with unobstructed views resulting in the ability to fully immerse themselves in the virtual environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As described herein "obstacle" refers to any applicable virtual element and/or visual effect that obstructs presentation and/or visualization of AR/VR/XR/etc. perspective to the viewer including, but not limited to digital objects, shadows/light obstructions, avatars, physical participants, advertisements, watermarks, trademarks, logos, and any other applicable digital representations known those of ordinary skill in the art.

As described herein "sensory input" refers to any applicable data received from a user associated with an AR/VR/XR/etc. system including, but not limited to biological-based (e.g., heartrate, biometric signals, etc.), movement data, gestures (e.g., eye gazing, head nodding, hand/body movements, etc.), linguistic inputs, and the like. In some embodiments, the sensory input(s) execute instructions to remove and/or modify obstacles.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method, and computer program product for virtual environment-based obstacle manipulation. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
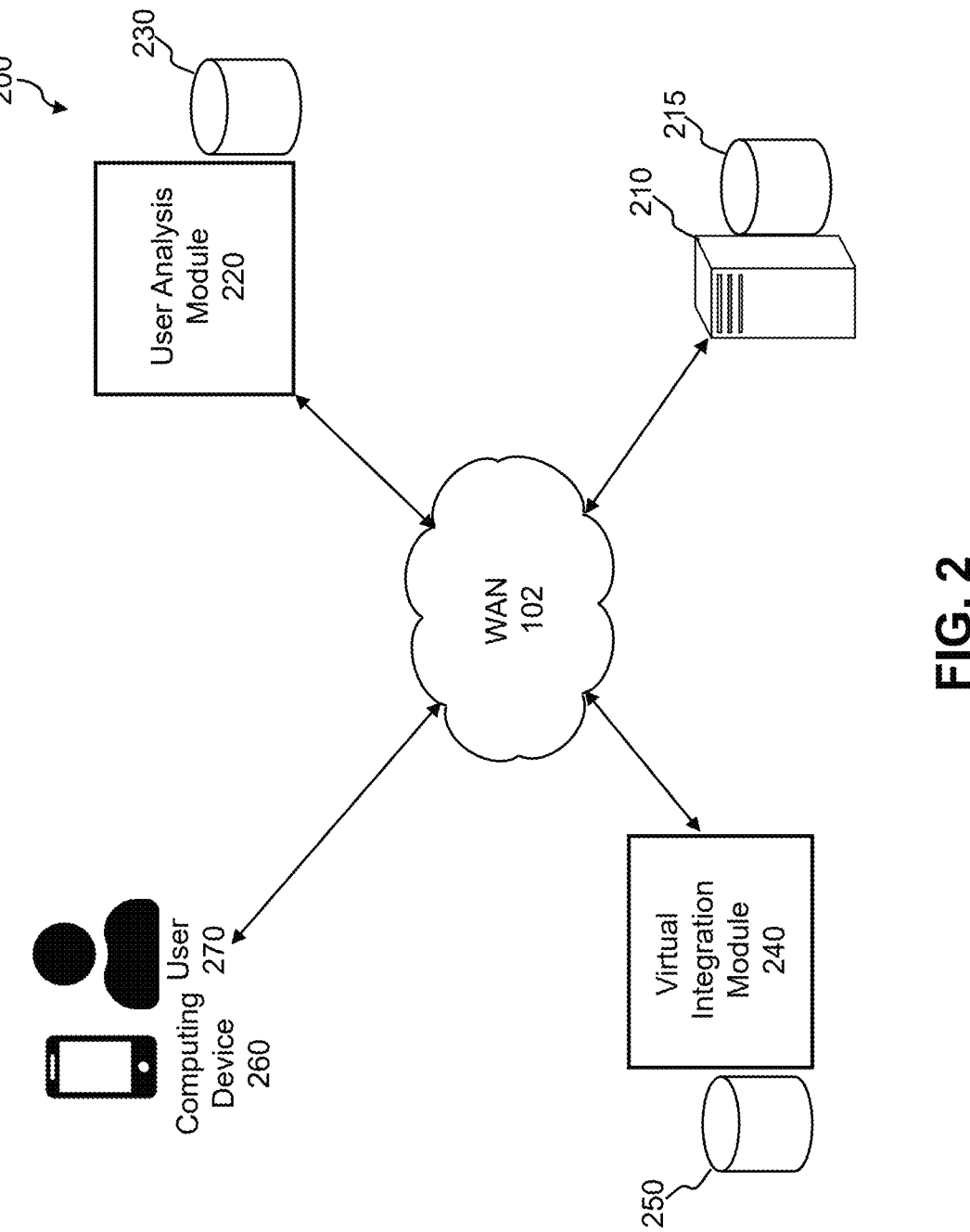
FIG. 2 illustrates a block diagram of a virtual environment-based obstacle manipulation system environment, according to an exemplary embodiment.

Referring now to FIG. 2, a functional block diagram of a networked computer environment illustrating a computing environment for a virtual environment-based obstacle manipulation system 200 (hereinafter "system") comprising a server 210 communicatively coupled to a database 215, a user analysis module 220, a user analysis module database 230, a virtual integration module 240, a virtual integration module database 250, a computing device 260 associated with a user 270, each of which are communicatively coupled over WAN 102 (hereinafter "network") and data from the components of system 200 transmitted across the network is stored in database 215.

In some embodiments, server 210 is tasked with providing the platform configured to allow user 270 to provide one or more manipulation inputs applied to the obstacle(s) which are ultimately integrated into the streaming media data and reflected in the virtual environment. In some embodiments, server 210 is configured to operate a centralized platform serving as a cloud-based obstacle manipulation software presented to user 270 on computing device 260, in which user 270 applies the manipulation inputs directly to a source frame associated with the applicable virtual environment derived from received streaming media data resulting in the obstacle manipulation(s) being applied to a target frame reflected in the optimized streaming media data. It should be noted that manipulation of obstacles may be limited based on various factors including, but not limited to contextual factors, ethical considerations, streaming media data integrity, and the like. For example, a virtual environment may be depicting a live 3D sporting event in which the initial view presented to user 270 is obstructed by the referee, in which manipulation of the referee may be warranted however it is limited in order to preserve the integrity of the relevant streaming media data (e.g., logo, copyright, video authenticity, etc.). As a result the referee is manipulated in a manner with the minimal distance from the referee's location coordinates within the source frame. Furthermore, server 210 may be communicatively coupled to one or more web crawlers configured to crawl applicable web-based data sources in order to extract relevant data associated with user 270 including, but not limited to geographic location of user 270, contextual information (e.g., how obstruction is detected and impacting user 270, relevance of obstruction, etc.), social media platforms, crowdsourcing platforms, and the like. In some embodiments, server 210 may generate viewer profiles associated with user 270 configured to be stored in database 215, in which the viewer profiles serve as analyses of sensory inputs derived from computing device 260 and other applicable user data including, but not limited to personal information, biological data, behavioral data, socio-demographic data, psychographic data, social media-based data, user analytics (e.g., user preferences, activity patterns, etc.), and the like.

User analysis module 220 is designed to receive and process various types of data associated with user 270 for the purpose of ascertaining actions, habits, and other applicable types of information associated with user 270 in order for virtual integration module 240 to detect obstacles. For example, sensor data derived from computing device 260 (e.g., eye gazing, body movements, facial movements, linguistic inputs, and the like), internet-based data associated with user 270 derived from the aforementioned web crawlers (e.g., social media information, internet browsing data, etc.), and any other ascertainable user related data known to those of ordinary skill in the art may be processed and analyzed user analysis module 220 for the purpose of detecting obstacles within virtual environments, in which the analyses are stored in user analysis module database 230. It should be noted that what is considered an obstacle may be subjective to each user in that strength of vision, preferences, etc. may differ depending on the viewer, in which user analysis module 220 supports gesture detection and analysis based on processing of the received sensor data and other applicable data, in which the gesture may be assist with the classification of obstacles. In some embodiments, user analysis module 220 may utilize one or more supervised and/or unsupervised learning techniques (e.g. feedback loops) in order to continuously optimize obstacle detection for user 270. For example, user 270 may indicate one or more obstacles are present within a virtual environment by squinting and making some type of hand gesture near their face; however, the ability of user analysis module 220 to correlate the aforementioned gestures as an indicator of an obstacle present in the virtual environment may be ascertained iteratively. In addition to analyses performed on user movements, speech, and other actions, user analysis module 220 may further consider relevant ethical consideration when analyzing whether obstacles are present within virtual environments. For example, the virtual environment may be depicting a live 3D sporting event in which the logo associated with the hosting server is perceived as an obstacle to user 270 based on analyses of their gestures; however, the logo may not be removed and/or modified due to ethical considerations. As a result, user analysis module 220 may instruct virtual integration module 240 to manipulate the logo within the associated streaming media data the minimal amount so that it is reflected in the virtual environment via the optimized streaming media data.

Virtual integration module 240 is tasked with analyzing virtual environments, obstacle detection, obstacle manipulation, and streaming media data optimization. It should be noted that analyses of the virtual environments may be accomplished by virtual integration module 240 utilizing one or more artificial intelligence-based techniques including, but not limited to Generative Adversarial Networks (GANs), natural language processing (NLP), linguistics analysis, image analysis, topic identification, virtual object recognition, setting/environment classification, and any other applicable artificial intelligence and/or cognitive-based techniques in order to analyze virtual environments and elements within and store analyses in virtual integration module database 250. In some embodiments, virtual integration module 240 is also tasked with identifying latent spaces and classifying obstacles, in which the classifying process comprises tagging/annotating and assigning parameters to obstacles based on analyses rendered by user analysis module 220 and virtual integration module 240. The tagging/annotating may be based on various factors including but not limited to the type of virtual element, location/orientation of virtual element within the virtual environment, manner in which user 270 interacted with virtual element (e.g., gazed, dismissed with gesture, squinted, made an annoyed facial reaction, etc.), type of virtual environment streaming media data is depicted within (e.g., live sporting event, virtual concert, Esport, etc.). Virtual integration module 240 may receive obstacle manipulation inputs from user 270 and/or automatically manipulate obstacles once detected utilizing the outputs of generative models, such as GANs, which account for various mechanisms such as, but not limited to depth estimation, occlusion handling, temporal consistency, etc. The aforementioned mechanisms result in optimized streaming media content configured to function as synthesized plausible content in obstructed regions detected in the streaming media data of the virtual environment after the obstacle manipulation by providing a right temporal consistency during the transition after said obstacle manipulation. Once virtual integration module 240 performs the obstacle manipulation, it performs proactive 3D construction of the virtual environment by utilizing generative models to perform techniques such as, but not limited to depth estimation and occlusion handling in order to ensure that the virtual environment looks realistic via considering distances between the obstacles and applicable virtual elements (e.g., background, partially visible virtual elements/objects, and the like).

Computing device 260 may take the form of a desktop computer, laptop computer, tablet computer, smart phone, smart watch or other wearable computer, mainframe computer, computer-mediated reality (CMR) device/VR device, quantum computer or any other form of computer or mobile device now known or to be developed in the future that is capable of running a program, accessing a network, or querying a database. It should be noted that in the instance in which computing device 260 is a CMR device (e.g., VR headset, AR goggles, smart glasses, etc.) or other applicable wearable device, computing device 260 is configured to collect sensor data via one or more associated sensor systems including, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a radar sensor, a LiDAR sensor, a temperature sensor, a humidity sensor, a motion sensor, internet-of-things ("IOT") sensors, or any other applicable type of sensors known to those of ordinary skill in the art.

Figure 3:
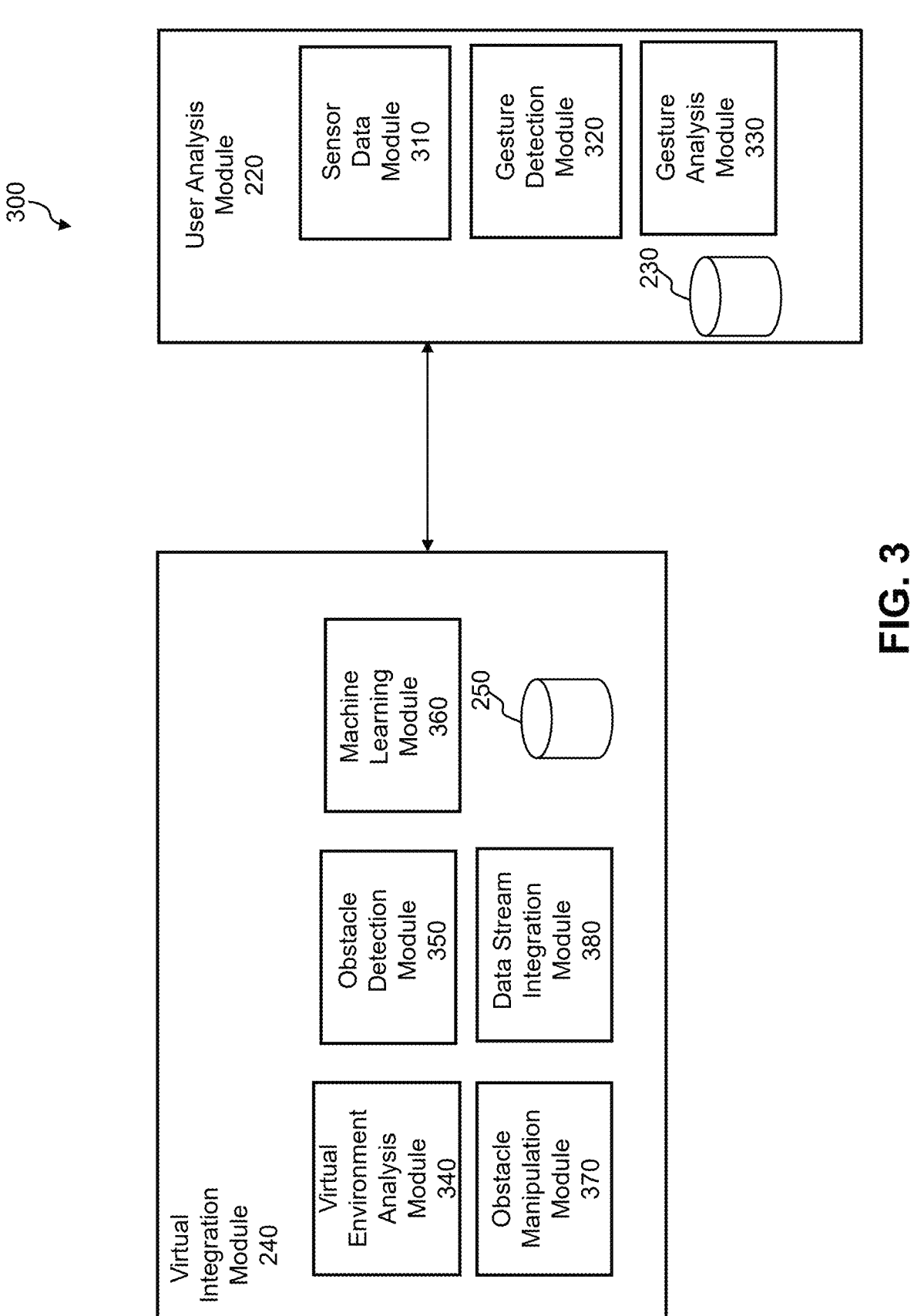
FIG. 3 illustrates a block diagram of various modules associated with the virtual environment-based obstacle manipulation system of FIG. 2, according to an exemplary embodiment.

Referring now to FIG. 3, an example architecture 300 of user analysis module 220 and virtual integration module 240 is depicted, according to an exemplary embodiment. User analysis module 220 comprises sensor data module 310, gesture detection module 320, and gesture analysis module 330. Virtual integration module 240 comprises virtual environment analysis module 340, obstacle detection module 350, machine learning module 360, obstacle manipulation module 370, and data stream integration module 380. It should be noted that user analysis module 220 and virtual integration module 240 are communicatively coupled over the network allowing for outputs and/or analyses performed by each respective module to be utilized in applicable training datasets to be utilized by applicable machine learning models operated by machine learning module 360 and/or applicable cognitive systems associated with system 200.

Sensor data module 310 is tasked with collecting applicable sensor data from computing device 260 and any other applicable systems associated with system 200 including, but not limited to monitoring system, imaging system, computer visioning system, internet-of-things (IOT) system, or any other applicable system configured to be associated with a smart network known to those of ordinary skill in the art. For example, sensor data derived from computing device 260 such as but not limited to image data, video data, movement data, LIDAR data, LADAR data, eye gazing data/historical eye movement, muscle tissue-based electrical activity (i.e., electromyography), and the like. It should be noted that one of the purposes of sensor data module 310 is to collect and analyze various sensor data in order to ascertain trends and patterns associated with user 270 within virtual environments. For example, reactions and gestures that user 270 makes when encountering obstacles (e.g., head tilt, diverting eye gaze, linguistic inputs, hand/arm swiping gestures, facial expressions, and the like), contextual information associated with when user 270 encounters obstacles (e.g., location/orientation of obstacles, type of obstacle/logo/advertisement, etc.), the amount of time user 270 interacts with the obstacle, how user 270 subsequently interacts with the obstacle and/or other virtual elements within the given virtual environment (e.g., converses with chatbot, leaves the virtual environment, and the like), resulting haptics, etc. Due to the volume of sensor data being continuously processed by sensor data module 310, sensor data module 310 is configured to support gesture detection module 320 with tagging the applicable sensor data as correlated to an obstacle based on the combination of gesture detection module 320 detecting the applicable sensor data as a gesture and obstacle detection module 350 identifying the applicable virtual element as an obstacle.

Gesture detection module 320 is tasked with detecting gestures of user 270 within the virtual environment derived from sensor data received by sensor data module 310. It should be noted that gestures may be one or more actions, words/linguistic inputs, facial expressions, eye/body movements, posture, and/or processed derivatives of user 270 configured to serve as indications of one or more obstacles present within the virtual environment that are impacting the VR/AR experience of user 270. In some embodiments, gesture detection module 320 is configured to extract natural language from gestures via sensor data module 310 referencing gestures associated with natural language stored within user analysis module database 230. Gesture detection module 320 may further process gestures based on identifying the portion of the body of user 270 (e.g., hands, head, etc.) in addition to the associated location and activity occurring during the gesture via communicating with applicable image recognition mechanisms of sensor data module 310. It should be noted that gesture detections are configured to be stored in virtual integration module database 250 for the purpose being rendered into detected gesture-based control commands configured to be accessed and initiated by obstacle manipulation module 370. For example, a swiping gesture by user 270 may initially indicate that a virtual element is serving as an obstacle to what user 270 is attempting to view within the virtual environment, in which the swiping gesture is correlated to a user obstacle manipulation input and stored in virtual integration module database 250 for subsequent accessing and initiation by obstacle manipulation module 370 to manipulate an obstacle; thus, allowing a library of obstacle manipulation gestures to continuously be contributed to.

Gesture analysis module 330 is tasked with analyzing gestures of user 270 within the virtual environment in order to assist obstacle detection module 350 with detecting obstacles. In some embodiments, gesture analysis module 330 further configured to utilize natural language processing ("NLP")/linguistics processing, image/media recognition, object recognition, predictive analytics, behavioral classification techniques, and the like in order to establish a context associated with the correlation of gestures with detected obstacles. Various gestures performed (e.g., based on complexity) by user 270 are subject to the contextual information, in which contextual information may include, but is not limited to time data (e.g., time of day, day of the week, etc.), event data associated with streaming media data, biometrics of user 270 (e.g., heartrate, blood glucose levels, etc.), mood of user 270, location of obstacle, virtual element the obstacle is obstructing, and the like. For example, if user 270 is viewing a live event within the virtual environment and the facial expression of user 270 indicates the obstacle is obstructing user 270 viewing the live event then the contextual information allows gesture analysis module 330 to ascertain which gestures are necessary in order to manipulate the obstruction. Furthermore, analyses of gestures user 270 performed while obstacle detection module 350 identifies obstacles and latent spaces not only allows user obstacle manipulation inputs to be established by learning gestures of user 270, but also assists obstacle manipulation module 370 to ascertain where to assign an obstacle within the virtual environment upon receiving and processing user obstacle manipulation inputs applied to the obstacles. In some embodiments, gesture analysis module 330 may correlate and map sensor data derived from sensor data module 310 (e.g., applicable data derived from cameras, microphones, computing device 260, and the like). As a result, gesture analysis module 330 may communicate with machine learning module 360 in order to utilize supervised or unsupervised machine learning techniques to generate personalized sensor models for user 270 specific to computing device 260. For example, unsupervised machine learning may use K-means clustering for virtual environment parameter detection and R-CNN for interaction or activity detection of user 270 within the applicable virtual environment. For example, when a light source has a value higher than a specified value and user 270 performs an action, a personalized sensor model maintained by sensor data module 310 may determine a similar future virtual environment parameter that triggers a response from user 270 and generates a set of possible options in conjunction with other components system 200. In some embodiments, sensor data module 310 may utilize information derived from the web-crawlers to ascertain environmental parameters associated with the physical space the applicable virtual environment is derived from, identify new types of virtual environment parameters, identify corrective actions to take based on a type of virtual environment parameter, combinations thereof, or any other supporting action to aid in the personalized sensor model identifying a suitable action to be performed.

Virtual environment analysis module 340 is tasked with analyzing virtual environments in order to ascertain virtual elements such as, but not limited to virtual environment landscapes (e.g., boundaries, backgrounds, foregrounds, etc.), virtual environment themes, patterns, virtual objects (i.e., virtual elements configured to support interactions with user 270 within the virtual environment), avatars, virtual agents, factors associated with computing device 260 such as but not limited to physical surroundings (e.g., architectures, time periods/time of day, etc.), geographic location, and the like. It should be noted that virtual environment analysis module 340 may utilize image/video analysis, parsing, tokenizing, 3D point cloud segmentation, virtual object detection, theme identification, or any other applicable artificial intelligence-based and/or VR/AR-based analysis mechanisms known to those of ordinary skill in the art. In addition, virtual environment analysis module 340 may utilize natural language processing and other applicable cognitive-based techniques in order to process linguistic inputs of user 270 and others applicable avatars within the given virtual environment to ascertain contextual information associated with a given virtual environment. In some embodiments, contextual information may be ascertained in light of one or more gestures performed by user 270 within the virtual environment as a reaction to a detected obstacle. For example in reaction to a detected obstacle, user 270 may squint or another applicable gesture in an attempt to view something within the virtual environment obstructed by the obstacle in which virtual environment analysis module 340 ascertains the contextual informational indicating that the obstacle is partial/completely obstructing the view of user 270 and/or impacting the virtual experience of user 270.

Obstacle detection module 350 is tasked with detecting obstacles within virtual environments along with identifying latent spaces within the virtual environments configured to be associated with obstacle manipulations. It should be noted that one of the purposes of latent space identification is to ascertain a virtual space within the virtual environment to accommodate obstacles via the obstacle manipulations. Furthermore, due to the ability of obstacles within virtual environments to be caused by various factors such as, but not limited to virtual environment design, configuration of light paths, analysis of physical space the virtual environment is derived from, and the like, obstacle detection module 350 is configured to utilize various of sources of data in order to facilitate obstacle detection. For example, previous observations and/or characteristics of virtual environments derived from the analysis of the applicable physical space are stored in virtual integration module database 250 to serve as historical datasets, in which obstacle detection module 350 is configured to identify distinctions between the virtual environments across various time intervals such as virtual environment configurations, layouts, design, etc. In some embodiments, obstacle detection module 350 is configured to communicate with machine learning module 360 in order to perform iterative classification of obstacles and latent spaces as detections are occurring. In some embodiments, obstacle detection module 350 accounts for ethical considerations when detecting obstacles in order to preserve integrity of virtual elements of the source frames associated with the streaming media data. For example, obstacle detection module 350 may analyze whether the detected obstacles are able to be manipulated without violating trademark, copyright, branding, etc. related concerns pertaining the media content within the streaming media data in attempt to ensure the aforementioned rights are not compromised. Furthermore, obstacle detection module 350 is configured to utilize media depth mechanisms in order to estimate the depths of virtual elements while being classified as obstacles. For example, obstacle detection module 350 may communicate with machine learning module 360 in order to utilize media recognition models, segmentation models, depth models, and any other applicable neural networks, such as but not limited to region-based convolutional neural networks to determine the position, content, label, etc. associated with detected obstacles. As a result, depth estimation of detected obstacles is performed on the virtual element from a point cloud, in which obstacle detection module 350 utilizes the point cloud to generate three-dimensional positions relative to anchors within the applicable virtual environment extracted from the source frames associated with the streaming media data. In some embodiments, obstacle detection module 350 is configured to generate depth maps comprising defined image accuracy by utilizing models trained using semantic edge-weighted loss functions and the like, in which the depth maps have optimized local and global accuracy; thus, reducing computing resources otherwise needed to process workloads associated with generating a depth map.

Machine learning module 360 is configured to use one or more heuristics and/or machine learning models for performing one or more of the various aspects as described herein (including, in various embodiments, the natural language processing or image analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 360 is designed to maintain one or more machine learning models dealing with training datasets including data derived from one or more of database 215, user analysis module database 230, virtual integration module database 250, and any other applicable internet-based data source. Furthermore, the one or more machine learning models are designed to generate outputs representing predictions pertaining to obstacle detection and latent space identification within virtual environments. In some embodiments, machine learning module 360 is configured to utilize a generative model to maintain a three-dimensional (3D) reconstruction model of the virtual environment to process a plurality of virtual element data associated with the virtual environment. One of the purpose of the 3D reconstruction model is to ensure accurate relocation of detected obstacles into identified latent spaces in a manner that preserves the integrity of the source frames derived from the streaming media data by rendering optimized streaming media data for visualization within virtual environment comprising synthesized content reflected the manipulated obstacle(s). In some embodiments, the output of the 3D reconstruction model is the synthesized content, in which the synthesized content comprises a right temporal consistency during the transition from the streaming media content to the optimized streaming media content (i.e., after the obstacle(s) are manipulated within the virtual environment) so that the manner in which user 270 engages with the virtual environment is revolutionized. For example, virtual elements that were previously partially and/or completely occluded within the virtual environment are made visible by the 3D reconstruction model synthesizing content configured to be integrated into an optimized stream media data that depicts unobstructed views (e.g., free of obstacles) to user 270 on computing device 260 in real-time. Furthermore, machine learning module 360 is designed to maintain one or more classifiers configured to communicated with the generative models in order to not only utilizes a plurality of discriminant networks to assist with classifying which virtual elements within a virtual environment are obstacles, latent spaces, and/or protected virtual elements (e.g., logos, trademarks, copyright-protected content, etc.). For example, two distinct discriminant networks (a first dedicated towards source frames and the second dedicated towards target frames derived from the streaming media content) support discrimination as to whether a given sample of a frame is real or generated by the generative models; thus, machine learning module 360 may not only classify virtual elements accordingly, but also a ranking and/or level of importance to a virtual element preventing it from being manipulated regardless of user 270 attempting to apply obstacle manipulation inputs.

Obstacle manipulation module 370 is tasked with automatically and/or manually manipulating obstacles detected by obstacle detection module 350. It should be noted that automation of the manipulation of obstacles may be subject to various factors including, but not limited to the detected and analyzed gestures of user 270, the location/orientation of the detected obstacles and/or identified latent spaces, the ascertained contextual information, the type of virtual event that is occurring within the virtual environment, and the like. In some embodiments, manipulation of obstacles is based on user manipulation inputs provided by user 270 (e.g., gestures, voice input/commands, etc.); however, obstacle manipulation module 370 may automatically perform manipulation on obstacles by ascertaining previous instances of manipulations from the historical datasets. For example, manipulation may be based upon previously applied manipulations from previous sessions in which it is indicated that the relevant angle(s) correlates the applicable virtual object(s) as obstacles.

Data stream integration module 380 is tasked with integrating the obstacle manipulations into the streaming media data resulting in an optimized stream of media data. It should be noted that data stream integration module 380 is designed to integrate optimized streams of media data reflecting the manipulations to obstacles manifested via sound, video, audio, and the like rendered by the generative models maintained by machine learning module 360. In some embodiments, data stream integration module 380 instructs machine learning module 360 to utilize minimum functions, maximum functions, and any other applicable algorithms during the aforementioned discrimination process allowing for data stream integration module 380 to integrate target frames that optimize the streaming media data with visualizations free of obstacles obstructing views of user 270 within the given virtual environment. In some embodiments, data stream integration module 380 utilizes supervised and/or unsupervised learning techniques in order to optimize the manipulations to the obstacles in accordance with the preferences of user 270. For example, outputs of the generative models may result in automated obstacle manipulations that fail to remove the detected obstacle completely out of the unobstructed view of user 270, in which the optimization provided by the aforementioned feedback loop ensures that the visualization of the optimized streaming media data comprising the target frames are progressively enhanced based on the feedback of user 270.

Figure 4:
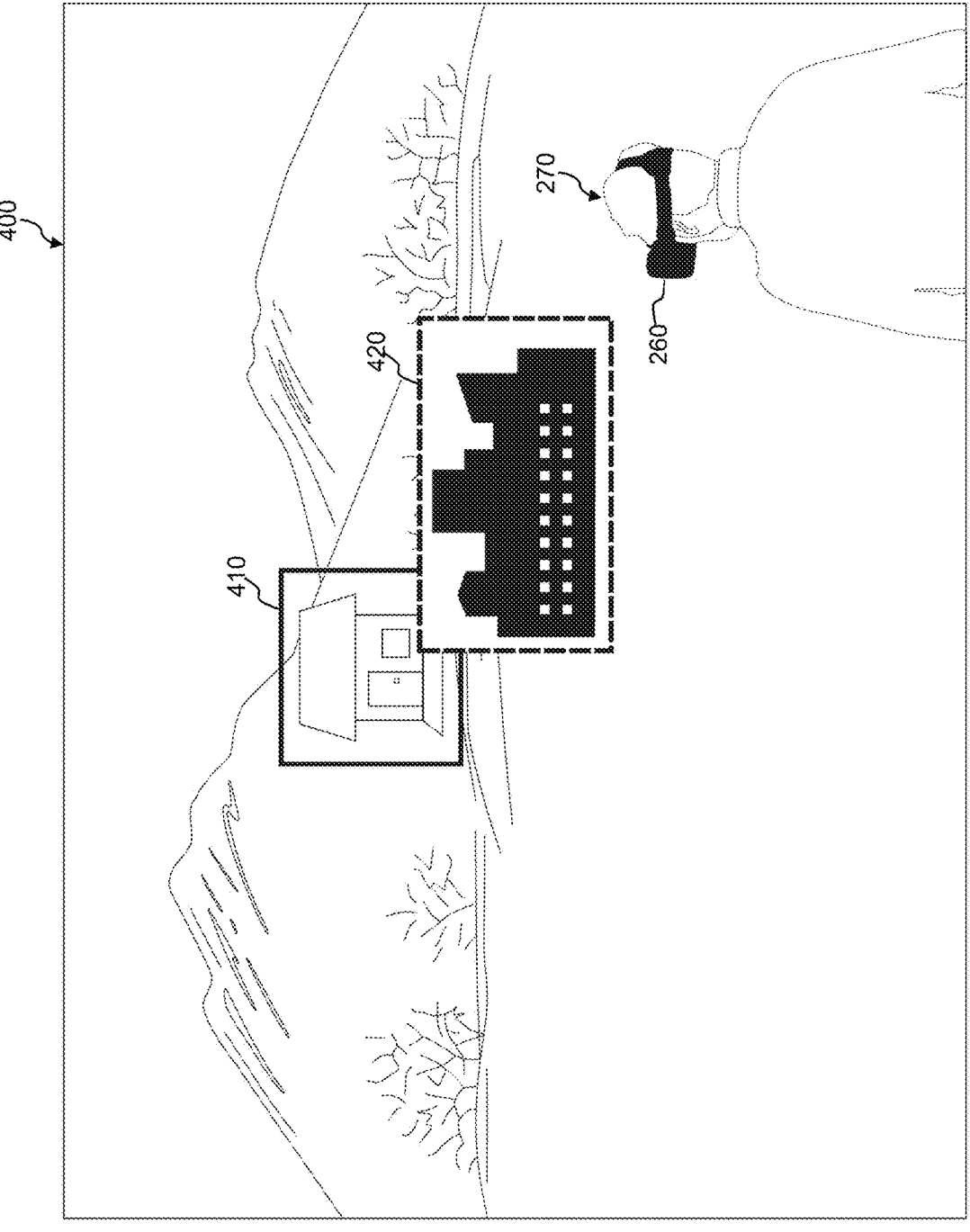
FIG. 4 illustrates a virtual environment including a first view obstructed by an obstacle presented on a computing device, according to an exemplary embodiment.

Referring now to FIG. 4, a virtual environment 400 is depicted including a virtual element 410 within an obstructed view of user 270 caused by obstacle 420, according to an exemplary embodiment. It should be noted that while user 270 is viewing virtual environment 400 through computing device 260, virtual environment analysis module 340 is analyzing and mapping virtual environment 400, in which virtual environment analysis module 340 stores relationships between virtual elements within the source frames and target frames derived from the streaming media data based on changed references between the aforementioned. This also allows user 270 to edit virtual elements of virtual environment 400 from any desired angle subject to their orientation. As mapping is occurring, virtual environment 400 is being converted from 3D augmented reality data to a series of source frames configured to be processed, annotated, etc. by machine learning module 360. It is within the source frames that obstacle detection module 350 is able to traverse the source frames based on ascertained contextual information and other applicable information derived from outputs of machine learning module 360. This approach also improves computer functionality since the amount of computing resources otherwise needed to process the 3D augmented reality data is reduced by partitioning the augmented reality data into source frames for processing by the applicable modules of user analysis module 220 and virtual integration module 240. Analyses of virtual environment 400 allow the proactive 3D reconstruction of the virtual elements (e.g., background, orientations, virtual objects, etc.) via generating the 3D reconstruction model along with ascertaining of contextual information and other applicable data related to virtual environment 400. For example in FIG. 4, virtual environment 400 is a desert comprising obstacle 420 and other applicable virtual elements associated with the desert (e.g., sandstorms, simulated solar brightness, etc.) which are partially obstructing the view of virtual element 410 (i.e., a desert structure). Mapping and annotating of each of the aforementioned virtual elements allows for functionalities of depth estimation, occlusion handling, temporal consistency analyses, etc. to be performed.

Figure 5:
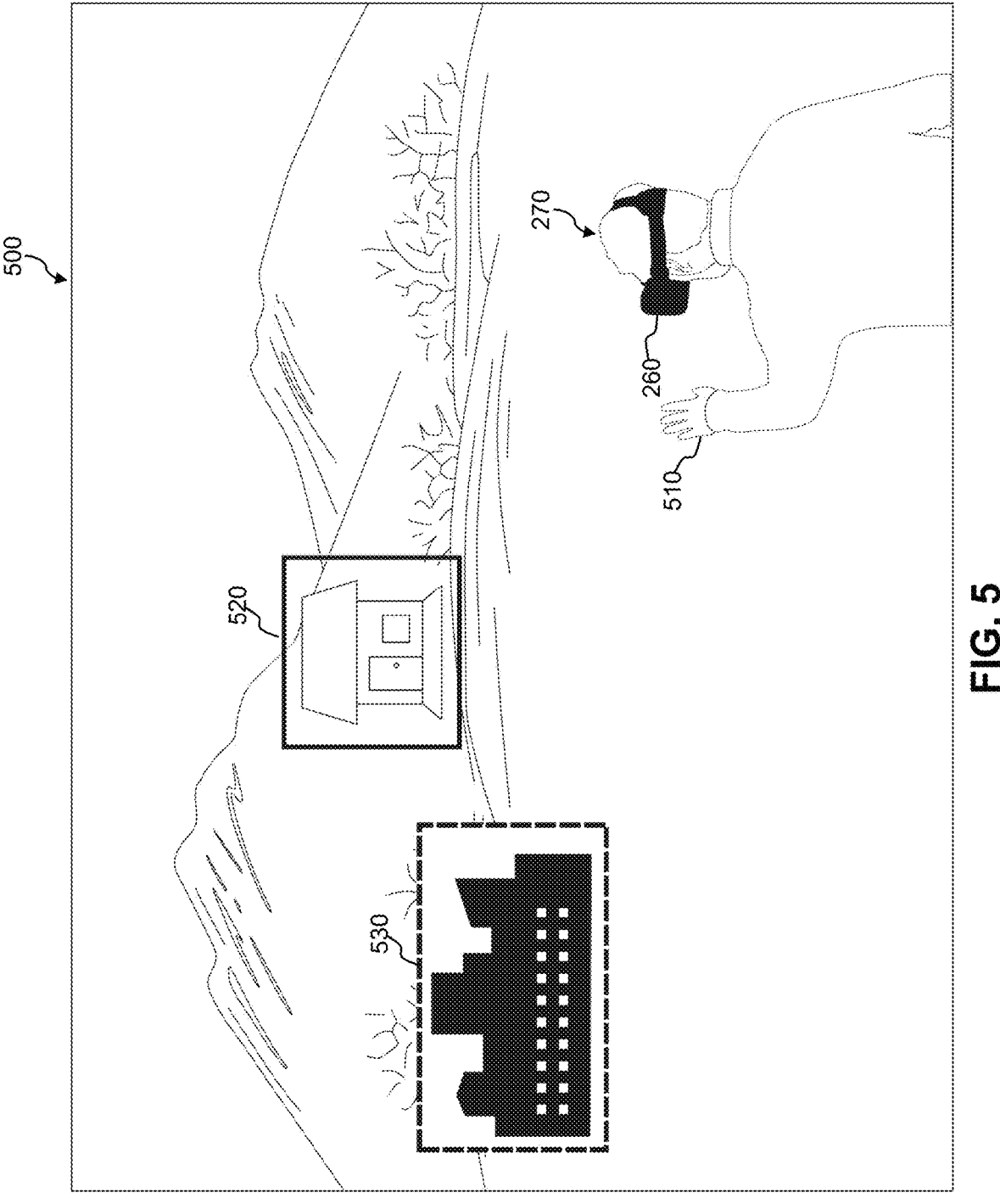
FIG. 5 illustrates the virtual environment of FIG. 4 including the first view rectified by manipulation of the obstacle presented on the computing device, according to an exemplary embodiment.

Referring now to FIG. 5, an obstacle manipulated virtual environment 500 is depicted according to an exemplary embodiment. In some embodiments, user 270 performs a gesture 510, in which the sensor data associated with gesture 510 is collected by sensor data module 310, gesture 510 is detected by gesture detection module 320 based on analyses of applicable sensor data, and gesture analysis module 330 determines that user 270 is utilizing gesture 510 to apply user manipulation inputs to obstacle 420. As a result of obstacle 420 receiving the user manipulation inputs, obstacle detection module 350 processes ethical consider- ations associated with virtual environment 400 and applies the user manipulation inputs to manipulated obstacle 520 based on one or more of the outputs of machine learning module 360, ascertained ethical considerations, etc. In some embodiments, manipulated obstacle 520 is a result of auto- mated instructions derived from the outputs of machine learning module 360, in which the view of virtual element 410 being classified as obstructed results in various auto- mated instructions being processed by obstacle manipula- tion module 370. For example, eye gazing data of user 270 derived from sensor data module 310 processing sensor data collected by computing device 260 may indicate that the eyes of user 270 are diverting from virtual element 410 due to the presence of obstacle 420, in which obstacle manipu- lation module 370 automatically relocates manipulated obstacle 520 in a manner that exposes virtual element 410 unobstructed to user 270. It should be noted that manipu- lated obstacle 520 is embodied in a target frame which is integrated into the optimized streaming media data in real- time resulting in seamless transition and visualization of the live event to user 270.

Figure 6:
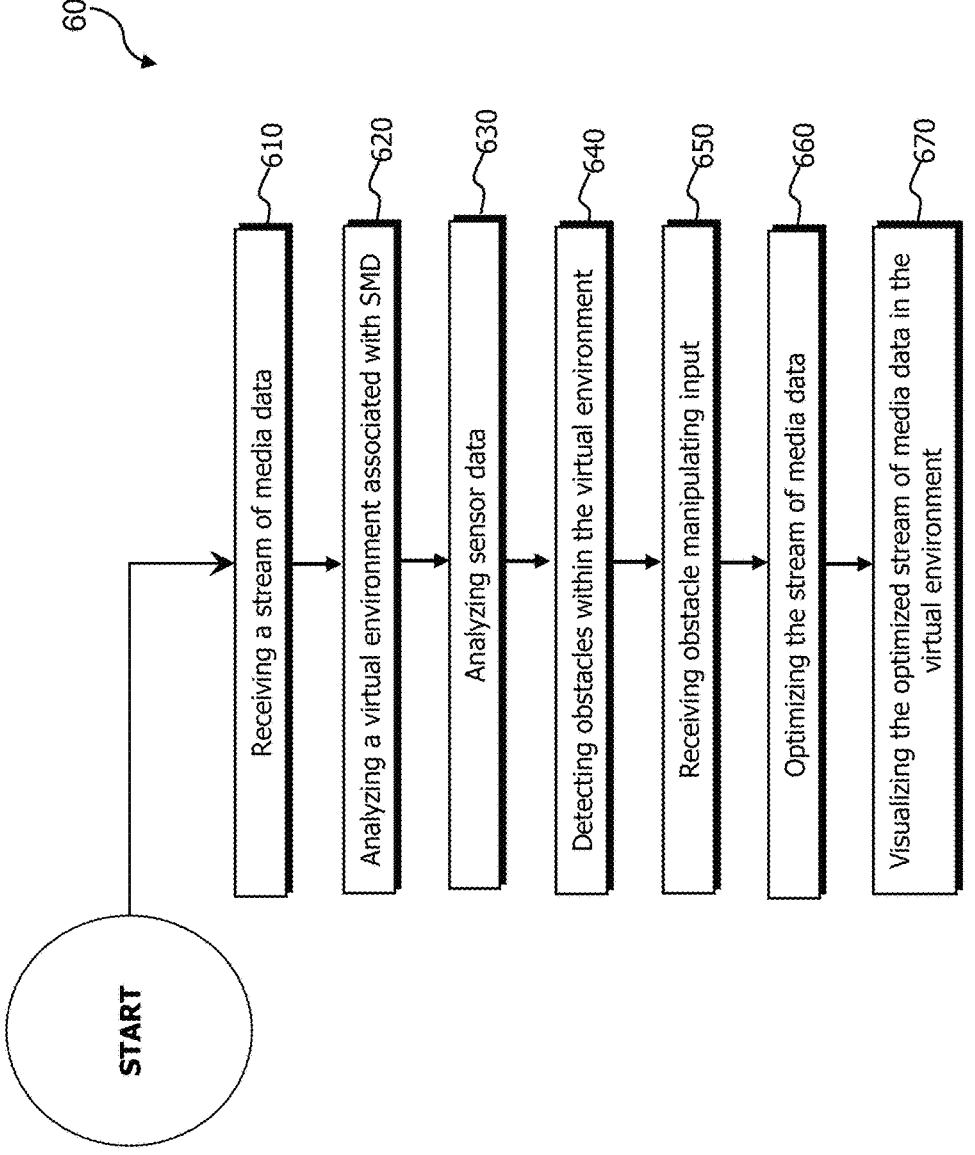
FIG. 6 illustrates an exemplary flowchart depicting a method for virtual environment-based obstacle manipulation, according to an exemplary embodiment.

With the foregoing overview of the example architecture, it may be helpful now to consider a high-level discussion of an example process. FIG. 6 depicts a flowchart illustrating a computer-implemented process 600 for virtual environment- based obstacle manipulation, consistent with an illustrative embodiment. Process 600 is illustrated as a collection of blocks, in a logical flowchart, which represents a sequence of operations that can be implemented in hardware, soft- ware, or a combination thereof. In the context of software, the blocks represent computer-executable instructions that, when executed by one or more processors, perform the recited operations. Generally, computer-executable instruc- tions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, virtual integration module 240 receives a stream of media data. It should be noted that the stream of media data may be emitted at high volume in a continuous, incremental manner processed with low-latency, in which the stream may be sourced from servers, IOT sensors, log files, and any other applicable type of multi- media data source known to those of ordinary skill in the art. In a preferred embodiment, the stream of media data is sourced from one or more virtual, augmented, extended, and/or mixed reality-based event sources, in which the stream of media data is collected and analyzed in real-time in order for applicable metadata to be applied to source frames derived from the stream media data that subsequently will receive manipulations at the target frames.

At step 620 of process 600, virtual environment analysis module 340 analyzes the virtual environment(s) associated with the stream of media data. Virtual environment analysis module 340 may communicate with machine learning mod- ule 360 in order to utilize one or more convolution neural networks (CNNs) in order to perform multi-media detection/ analyses systems, virtual space theme detection, virtual object analysis, virtual event type recognition, brand/logo detection, and the like within the target frames. In particular, the target frames are integrated in the applicable training datasets allowing predictions for manipulations to be ascer- tained and subsequently applied to the respective target frames. In some embodiments, virtual environment analysis module 340 communicates with machine learning module 360 configured to generate a 3D reconstruction model manifesting the attributes of the virtual environment asso- ciated with the streaming media data.

At step 630 of process 600, sensor data module 310 analyzes collected sensor data from computing device 260 and other applicable computing devices/systems. For example, sensor data module 310 analyzes sensor data derived from monitoring system, imaging system, computer visioning system, internet-of-things (IOT) system, or any other applicable system configured to connect to a network and/or be associated with a smart network known to those of ordinary skill in the art. Sensor data derived from computing device 260 such as but not limited to image data, video data, movement data, LIDAR data, LADAR data, eye gazing data/historical eye movement, muscle tissue-based electrical activity (i.e., electromyography), and the like are utilized in order to support various functions such as ascertaining contextual information and gestures of user 270 indicating manipulations to the streaming media data is warranted. For example, movement trends (e.g., eye gazing, squinting, etc.) and virtual environment-based gestures may be factored as indicators that obstacles are present and/or manipulation is warranted.

At step 640 of process 600, obstacle detection module 350 detects obstacles within the virtual environment(s) associ- ated with the streaming media data. As previously men- tioned, obstacle detection module 350 detects obstacles within virtual environments along with identifies latent spaces within the virtual environment(s) for the purpose of the obstacles to be potentially manipulated into one or more latent spaces. Obstacle detection module 350 is configured to communicate with machine learning module 360 in order to perform iterative classification of obstacles and latent spaces as detections are occurring based on the simultaneous performance of depth estimation, occlusion handling, tem- poral consistency, etc. In some embodiments, obstacle detection module 350 accounts for ethical considerations when detecting obstacles in order to preserve integrity of virtual elements of the source frames associated with the streaming media data.

At step 650 of process 600, obstacle manipulation module 370 receives the obstacle manipulating inputs. In some embodiments, obstacle manipulation module 370 automati- cally and/or manually manipulates obstacles detected by obstacle detection module 350. Obstacle manipulations may be automated and/or received directly from user 270 by applying inputs to computing device 260, in which inputs may be virtual environment-based gestures, linguistic inputs, keyboard inputs, and any other applicable computing device-based inputs known to those of ordinary skill in the art. It should be noted that automation of the manipulation of obstacles may be subject to various factors including, but not limited to the detected and analyzed gestures of user 270, the location/orientation of the detected obstacles and/or identified latent spaces for placement, the ascertained contextual information, the type of virtual event that is occurring within the virtual environment, and the like.

At step 660 of process 600, data stream integration module 380 optimizes the stream of media data. In particular, the target frames that manifest the obstacle manipulations are integrated into the streaming media data resulting a real-time distinction between the source frames and the target frames. For example, a detected obstacle within a source frame at a first position is now located at a second position reflected within the target frame and integrated in real-time within the streaming media data the source frame is derived from; thus, the optimized stream of media data may be a series of target frames rendered based on not only applicable obstacle manipulations but also ascertained contextual information and applicable ethical considerations associated with the detected obstacle(s).

At step 670 of process 600, data stream integration module 380 visualizes the optimized stream of media data in the virtual environment. In some embodiments, data stream integration module 380 visualizes optimized streams of media data reflecting the manipulations to obstacles manifesting sound, video, audio, and the like rendered GANs maintained by machine learning module 360. Furthermore, data stream integration module 380 instructs machine learning module 360 to utilize minimum functions, maximum functions, and any other applicable algorithms resulting in visualizations free of obstacles obstructing views of content within virtual events for user 270 within the given virtual environment(s).

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for virtual environment-based obstacle manipulation, the method comprising:
   receiving, by a computing device, a stream of media data associated with a virtual environment;
   analyzing, by the computing device, a plurality of sensor data associated with a user of the virtual environment;
   detecting, by the computing device, one or more obstacles associated with the virtual environment; and
   optimizing, by the computing device, the stream of media data, the optimizing comprising utilizing a three-dimensional (3D) reconstruction model of the virtual environment configured to be processed by a generative model and manipulation of the one or more obstacles based on the analysis of the plurality of sensor data.

2. The computer-implemented method of claim 1, wherein the one or more obstacles are inhibiting at least a view of the user within the virtual environment.

3. The computer-implemented method of claim 1, wherein analysis of the sensor data derives one or more of gaze detection, gesture analysis, linguistic input analysis, or combination thereof.

4. The computer-implemented method of claim 1, wherein optimizing the stream of media data comprises:
   receiving, by the computing device, a user input configured to direct a manipulation of the one or more obstacles;
   wherein the manipulation comprises removal or modifying the one or more obstacles based on the user input within the virtual environment.

5. The computer-implemented method of claim 1, wherein optimizing the stream of media data comprises:
   identifying, by the computing device, a plurality of latent spaces of the virtual environment based on one or more outputs of a machine learning model.

6. The computer-implemented method of claim 5, wherein utilizing the 3D reconstruction model comprises:
   utilizing, by the computing device, the generative model to perform an analysis of a plurality of virtual element data associated with the virtual environment.

7. The computer-implemented method of claim 5, wherein utilizing the 3D reconstruction model comprises:
   synthesizing, by the computing device, optimized stream media data generated by the generative model configured to be integrated into the virtual environment.

8. A computer program product for virtual environment-based obstacle manipulation, the computer program product comprising or more computer readable storage media and program instructions collectively stored on the one or more computer readable storage media, the stored program instructions comprising:
   program instructions to receive a stream of media data associated with a virtual environment;
   program instructions to analyze a plurality of sensor data associated with a user of the virtual environment;
   program instructions to detect one or more obstacles associated with the virtual environment; and
   program instructions to optimize the stream of media data, program instructions to optimize further comprising program instructions to utilize a three-dimensional (3D) reconstruction model of the virtual environment configured to be processed by a generative model and manipulate the one or more obstacles based on the analysis of the plurality of sensor data.

9. The computer program product of claim 8, wherein the one or more obstacles are inhibiting at least a view of the user within the virtual environment.

10. The computer program product of claim 8, wherein analysis of the sensor data derives one or more of gaze detection, gesture analysis, linguistic input analysis, or combination thereof.

11. The computer program product of claim 8, wherein the program instructions to optimize the stream of media data further comprise:
   program instructions to receive a user input configured to direct a manipulation of the one or more obstacles;
   wherein the manipulation comprises program instructions to remove or modify the one or more obstacles based on the user input within the virtual environment.

12. The computer program product of claim 8, wherein the program instructions to optimize the stream of media data further comprise:
   program instructions to identify a plurality of latent spaces of the virtual environment based on one or more outputs of a machine learning model.

13. The computer program product of claim 12, wherein the program instructions to utilize the 3D reconstruction model comprise:
   program instructions to utilize the generative model to perform an analysis of a plurality of virtual element data associated with the virtual environment.

14. The computer program product of claim 12, wherein the program instructions to utilize the 3D reconstruction model comprise:
   program instructions to synthesize the optimized stream media data generated by the generative model configured to be integrated into the virtual environment.

15. A computer system for virtual environment-based obstacle manipulation, the computer system comprising:

one or more processors;

one or more computer-readable memories;

program instructions stored on at least one of the one or more computer-readable memories for execution by at least one of the one or more processors, the program instructions comprising:

program instructions to receive a stream of media data associated with a virtual environment;

program instructions to analyze a plurality of sensor data associated with a user of the virtual environment;

program instructions to detect one or more obstacles associated with the virtual environment; and program instructions to optimize the stream of media data, program instructions to optimize further comprising program instructions to utilize a three-dimensional (3D) reconstruction model of the virtual environment configured to be processed by a generative model and manipulate the one or more obstacles based on the analysis of the plurality of sensor data.

16. The computer system of claim 15, wherein the one or more obstacles are inhibiting at least a view of the user within the virtual environment.

17. The computer system of claim 15, wherein the program instructions to optimize the stream of media data further comprise:

program instructions to receive a user input configured to direct a manipulation of the one or more obstacles;

wherein the manipulation comprises program instructions to remove or modify the one or more obstacles based on the user input within the virtual environment.

18. The computer system of claim 15, wherein the program instructions to optimize the stream of media data further comprise:

program instructions to identify a plurality of latent spaces of the virtual environment based on one or more outputs of a machine learning model.

19. The computer system of claim 18, wherein the program instructions to utilize the 3D reconstruction model comprise:

program instructions to utilize the generative model to perform an analysis of a plurality of virtual element data associated with the virtual environment.

20. The computer system of claim 15, wherein the program instructions to utilize the 3D reconstruction model comprise:

program instructions to synthesize the optimized stream media data generated by the generative model configured to be integrated into the virtual environment.

* * * * *